350-6.8 SR CROSS REFERENCE SEARCH ROOM

XR 3,457,422

TX 3058D

OPTICAL SYSTEM ADAPTED FOR ROTATION OF AN IMAGE TO BE SCANNED WITH REFERENCE TO A SCANNING PATH

Filed Feb. 21, 1967 4 Sheets-Sheet 1

INVENTOR
HANS R. ROTTMANN

BY Henry Powers
ATTORNEY

3457422
OR IN 250/548

United States Patent Office 3,457,422

Patented July 22, 1969

3,457,422

OPTICAL SYSTEM ADAPTED FOR ROTATION OF AN IMAGE TO BE SCANNED WITH REFERENCE TO A SCANNING PATH

Hans R. Rottmann, Poughkeepsie, N.Y., assignor to International Business Machines Corporation, Armonk, N.Y., a corporation of New York Filed Feb. 21, 1967, Ser. No. 617,674

Int. Cl. H02p *1/54*

U.S. Cl. 250—219 16 Claims

ABSTRACT OF THE DISCLOSURE

A scanning system having means interposed in an optical path of a projected image directed to a scanning means for rotating the projected image in a plane normal to its optical path and into a desired relationship with reference to the scanning path of the scanning means.

BACKGROUND OF THE INVENTION

This invention relates to scanning devices, and more particularly to an optical means for effecting the orientation of a scanned object with reference to a scanning path of a scanning system.

Scanning systems for irradiated or illuminated bodies have been employed for a variety of applications. In a typical scanning system, a suitable form of irradiation, for example light, is transmitted to an object to be scanned and thence to a radiation or light responsive sensing means. The sensing function is performed by modifying the light reflected to the sensing means by suitable scanning devices which casue progressive portions of the article to be reflected to the sensing means which then senses the intensity or modulation of the light reflected to it and converts it into a suitable form of data manifestation, as for example an electrical pulse pattern.

In one application such system may be used for measuring the two-dimensional extension of a body such as its width and/or length. For example, this may involve the measurement of the spacing between opposite edges of two opaque regions of a partially transparent element, such as are found in optical masks of the type employed in the art of photolithography.

In another application such scanning systems are employed to effect accurate positioning of articles for variouts close tolerance manufacturing operations. Such close control of tolerance is particularly critical in multi-stage masking operations employed in the manufacture of microelectronic components having dimensions of the order of 0.1 mil by 100 mils. For these masking operations extremely close control must be employed for registration between optical masks and a substrate, and scanning systems are known which are designed to orientate the substrate and/or masks with respect to each other or with reference to the coordinate axes of a reference plane.

Heretofore the systems used for scanning various objects have been restricted to one-dimensional scanning, thus requiring a plurality of scanning devices corresponding to the number of dimensions scanned. These systems while successful, are, however, characterized by a number of inherent disadvantages and limitations. First, each scanning device, regardless of the suspension employed therefor, is susceptible to mechanical vibrations and disturbances with consequent detraction from the accuracy in the response of the scanning by the attendant error of each device. Also, the use of a plurality of scanning devices requires not only a continuing alignment for each device, but also the establishment and maintenance of synchronization therebetween. This is particularly important in positioning systems where the ultimate orientation of an object is dependent on the relative position of the object with respect to a coordinate axes reference system. In addition, impairment in the reflectance of the light intensity in one of a plurality of scanning devices also introduces the possibility of error in the response of the scanning system.

SUMMARY OF THE INVENTION

In contrast to the foregoing, the instant invention provides a scanning system which enables the use of a single scanning device for the unidirectional or parallel scanning of a two-dimensional extension of an object, which minimizes the disadvantages inherent in the use of a plurality of scanning devices for a similar purpose.

Briefly, the scanning system of this invention comprises a source of light for illuminating an object from which an image of the object is projected in a light beam directed to a beam splitter which splits the beam into two distinct beams. A suitable means for optically rotating the image, which may be comprised of a Dove or Pechan prism, is disposed in one of the paths for rotating the image in the beam in a plane normal to the path into a desired relationship with respect to the scanning path of a scanner which for unidirectional scanning may be in the form of a rotary polygonal mirror system. Reflecting means, such as mirrors, are disposed in the optical paths of the projected image to deviate the unrotated image and the rotated image to the scanner where the images are, in the preferred embodiment, simultaneously scanned along unidirectional or parallel paths across suitable photosensitive means which provides an output representing information of the spatial extension of the object.

Among the applications for the scanning system of this invention, is the measuring of the dimension of an object and/or the orientating of the object with respect to coordinate axes of a reference plane.

Accordingly, it is an object of this invention to eliminate disadvantages of the prior art.

A further object of this invention is to provide a novel and improved optical scanning means.

It is also an object of this invention to provide a scanning system for scanning a dimension extending transverse a scanning path.

An additional object of this invention is to provide a unidirectional scanning means for obtaining two-dimensional information of an object.

A further object of this invention is to provide a scanning means having unidirectional or parallel scanning paths for the measurement of corresponding parallel and transverse dimension of an object.

Another object of this invention is to provide a novel scanning means for measuring the extension of an object extending transverse a scanning path of the system.

Still another object of the invention is to provide an improved electro-optical article position system.

It is also an object of this invention to provide a novel article positioning system means for orientating an object with respect to a coordinate axes system of a reference plane.

The foregoing and other objects, features and advantages of the invention will be apparent from the following more particular description of the preferred embodiments of the invention as illustrated in the accompanying drawings wherein:

THE DRAWINGS

DESCRIPTION OF THE PREFERRED EMBODIMENTS

Figure 1A:
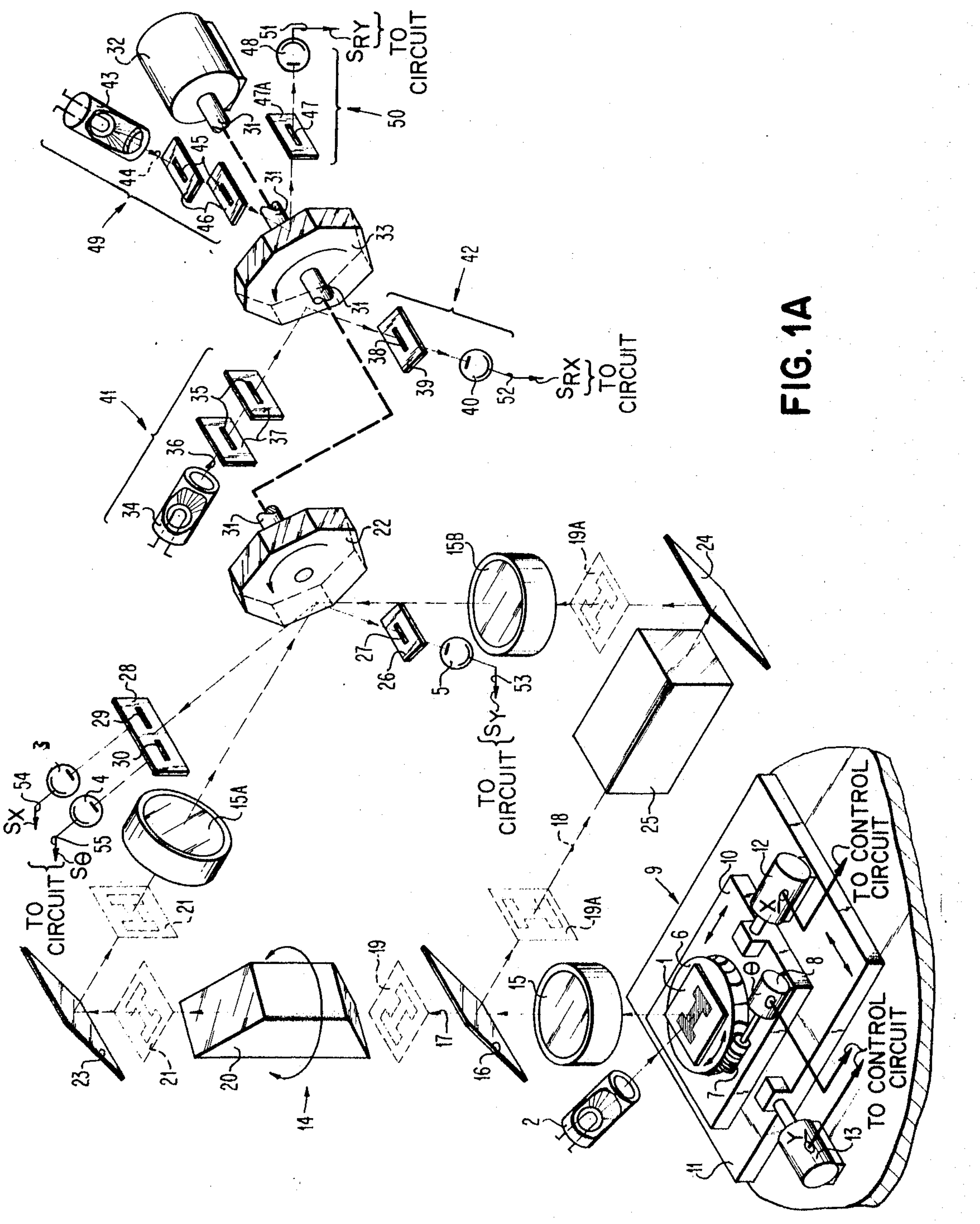
FIGURE 1A is a diagrammatic perspective illustrating one embodiment of the invention for positioning an object with reference to a pair of coordinate axes.
Figure 1B:
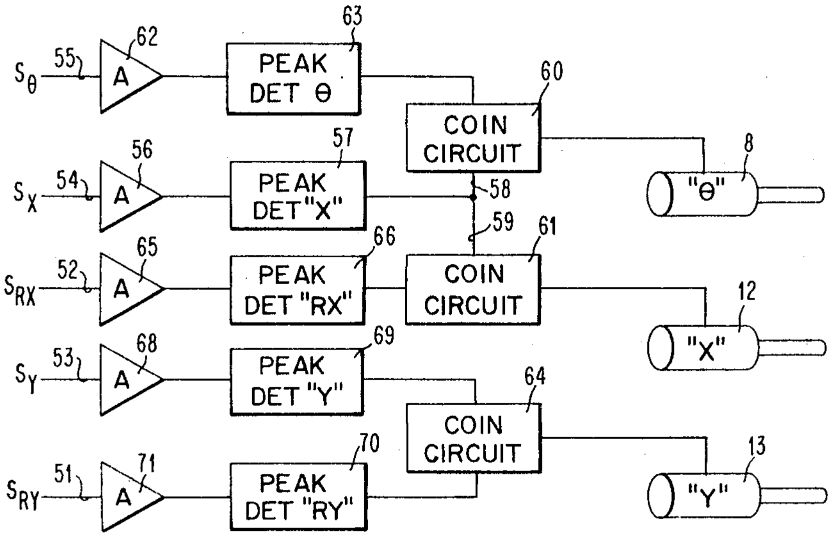
FIGURES 1B and 1C are electrical schematic block diagrams of known electronic components arranged to form distinct and appropriate circuits which may be employed with the system of FIGURE 1A.
Figure 1C:
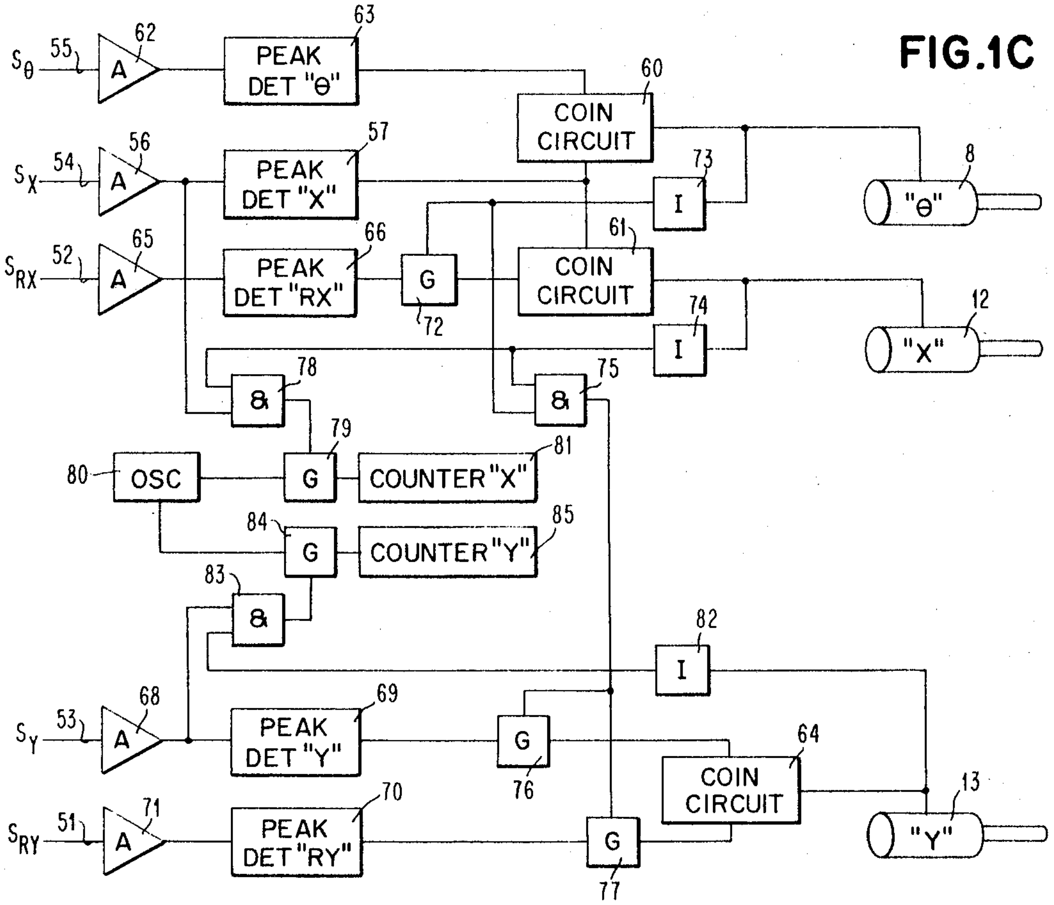

Referring now more particularly to FIGURE 1A, the arrangement there illustrated comprises an optical-mechanical arrangement which may be combined with any one of the circuits of FIGURES 1B to 1C into a positioning system for orientating an article 1 with respect to a pair of coordinate axes X–Y of a datum plane, or with respect to a desired reference plane. Article 1 may take the configuration of any workpiece for which accurate positioning is desired. This article 1 may be a work-blank or tool for various mechanical machining operations, or the article 1 may comprise a wafer or mask used in the processing of microelectronics. In addition, the article may have, as shown, a reflective surface for a source of illumination 2, or it may be nonreflective, thus resulting in a reflective image in one case or a shadow in the other. Either the reflective image or the shadow of article 1 may be used in the same manner, provided each variation is effective for providing the necessary variations in the light transmitted to a suitable radiation responsive sensing means, such as photocells, 3, 4 and 5.

The article 1, for purposes of elucidation, is shown here with the surface thereof provided with a "block I" imprint in order to provide a graphic visualization of image rotation in accordance with this invention.

Any system of illumination 2 for reflected (or transmitted) light may be used which will produce an optical image of the object to be positioned. In like manner, any radiation responsive sensing means may be used which will produce a variable electrical output corresponding with a variation in the incident light as the scanning operation is performed across the sample area. Thus, photoconductors, photomultipliers, gas-filled or vacuum photo tubes, or solid state detectors may be employed.

As shown, article 1 is supported on a rotatable platen 6 which is peripherally geared for rotational orientation through a gear box 7, to a positioning motor or servodrive 8. Platen 6 comprises part of a positioning unit 9 which includes cross-slides or tables 10 and 11 which are translatable in the X–Y direction, respectively, by positioning motors or servo-drives 12 and 13.

Associated with the positioning unit 9, in accordance with this invention, is an optical system generally indicated by the numeral 14 which enables the scanning of a desired extension of article 1 along a set scanning path which lies transverse an extension of the article which is to be scanned. The optical system 14 includes a collimating lens 15 which directs the reflected image of article 1 to a beam-splitter 16 which transmits and reflects the image along, respectively, optical paths 17 and 18 as corresponding first and second images 19 and **19*a***.

Interposed in the path 17 of the first optical image 19 is an optical image rotating element 20 which may comprise a Dove prism, as shown, or any other optical rotating element, such as a Pechan prism, which are adapted to rotate an image directed through it. Another, though complicated optical rotating system, which may be adapted for use with this invention may be found in U.S. Letters Patent No. 3,030,857. As shown, the Dove prism has its longitudinal extension disposed along the first optical path 17, and the optical image 19 transmitted through it can be readily orientated in the desired rotational configuration, in a plane normal to its optical path 17, by mere rotation of the Dove prism about its longitudinal extension until the rotated image 21 placed in the desired orientation, with respect to a plane within the scanning path of the scanner 22 by means of a stationary reflector 23 and eyepiece lens 15A. Scanner 22 also receives the unrotated second image 19A through an eyepiece lens 15B which is reflected to it by means of a stationary reflector 24 interposed in the second optical path 18 which may also include an optical compensating block 25.

In one form the scanner 22 can comprise a rotating mirror which will reflect an image, directed to it, across a scan plate provided with an aperture slit for transmission to a radiation responsive sensing means. In this manner the image reflected by scanner 22 is moved across the aperture slit at a rate which is determined by the angular velocity of the scanner. In the embodiment shown, the optically rotated image 21 is reflected by scanner 22 to a scan plate 26 provided with an aperture slit 27 through which light from the rotated image 21 passes to the photocell 5 which is adapted to convert the light into an electrical signal $S_Y$ which in one form, will be determined by the leading edge of the image in the scanning path. The output $S_Y$ of this photocell 5 is deployed over lead 53 to a suitable circuit for effecting the desired orientation of article 1 along the Y coordinate axis.

In a similar manner, the unrotated image will be reflected by scanner 22 onto a scan plate 28 provided with two aperture slits 29 and 30 which control the passage of light from the image 20 to photocells 3 and 4 respectively. Each of photocells 3 and 4 is adapted to convert the light passing to it into an electrical signal $S_X$ and $S_\theta$ which will be determined by two spaced points along the leading edge of image 19A in the scanning path. The outputs $S_X$ and $S_\theta$ of photocells 3 and 4 are deployed over respective leads 54 and 55 to the indicated circuit for effecting the orientation of article 1 along the X coordinate axis, and for angular orientation $\theta$.

In the embodiment shown, scanner 22 is illustrated with a polygonal peripheral surface, and it may be rotated about its axis 31 by means of a motor 32 to produce the desired scanning of the images reflected to it across the indicated photocells 3, 4 and 5. The polygonal faces of the scanner 22 are reflective and are optically ground to exhibit planar surfaces.

Also mounted about the scanner axis 31 is a second scanner 33 which is part of a reference system for generating reference signals $S_{RX}$ and $S_{RY}$ for correlation with the output signal derived from the scanning of the images of article 1. In general, scanner 33 is of similar construction as scanner 22.

The reference system also includes a source of light 34 from which a reference beam 36 is transmitted through the collimating slits 35 of slit plates 37 to scanner 33 from which it is reflected across a target slit 38 of scan plate 39 to a radiation responsive sensing means 40 for conversion of the incident light reference beam 36 into a corresponding output reference signal $S_{RX}$ over lead 52. Synchronization of the reference signal $S_{RX}$ with the scan signal $S_X$ may be effected by conventional techniques. For example, such synchronization may be obtained during prealignment of the system from the position of the initial placement of a first of a plurality of articles which will determine the desired position of subsequent articles. Thus, light source 34 and its associated slit plates 37 may be mounted for movement together as a light unit 41 for adjustment of the angle of incidence of light beam 36 to scanner 33. In similar manner, scan plate 39 and radiation sensor 40 are also mounted together as a sensing unit 42 which is movable to a position at a desired angle of reflectance of light beam 36 from scanner 33. As a result, the movement or adjustment in the relative positions of light unit 41 and sensing unit 42 provides a suitable means for obtaining a desired correlation or prealignment of the reference signal $S_{RX}$ with respect to time. In the embodiment illustrated the prealignment reference signal $S_{RX}$ is made so that it will coincide with the scan output signal $S_X$ corresponding to the leading edge of unrotated image 19A in the scan path of scanner 22.

A similar source of reference signals $S_{RY}$ is provided by means of a source of light 43 from which reference beam 44 is transmitted through the collimating slits 45 of slit plates 46 to scanner 33 for reflectance across a target slit 47 of scan plate 47A to the radiation responsive sensor 48 for the conversion of the incident beam 44 into the corresponding output reference signal $S_{RY}$ over leads 51. Prealignment of reference signal $S_{RY}$ with respect to time is, also, similarly effected by a relative adjustment of light source 43 and slit plates moveable together as a unit 49 with reference to sensor 48 and scan plate 47A also moveable together as a sensing unit 50. In like fashion the prealignment of reference signal $S_{RY}$ of the illustrated embodiment, is made so that it will coincide with the scan output signal $S_Y$ corresponding to the leading edge of the rotated image 21 in the scan path of scanner 22.

In FIGURE 1B, a circuit is illustrated which may be employed for correlation of the output scan signals $S_X$, $S_Y$, and $S_\theta$ with the reference signals $S_{RX}$ and $S_{RY}$ for actuation of servo-drives 8, 12 and 13 which position article 1 in the desired orientation with respect coordinate axes X–Y of a reference plane. As shown in the drawing, the output scan signals $S_X$ from the radiation responsive sensor 3, in the conductor 54, are amplified in the amplifier 56 and then connected to a peak detector circuit 57 whose output is connected over branch leads 58 and 59 to two coincidence circuits 60 and 61. In similar fashion the output signal $S_\theta$ on lead 55 from the radiation responsive sensor 4 is amplified in amplifier 62 and passed to the peak detector circuit 63 whose output is connected to the coincidence circuit 60 for comparison with the corresponding response generated from the scan signal $S_X$. Coincidence circuit 60, as well as coincidence circuits 61 and 64 generate on electrical error signal in response to a lack of coincidence of a pair of input signals, with the error used to correct the deviation by means of an associated servo drive. In this manner a lack of coincidence bewteen scan signals $S_X$ and $S_\theta$ will result in an output signal from the coincidence circuit 60 to the servo-drive 8 to rotate article 1 until its leading edge is parallel to the "Y" coordinate of the reference plane. When such a rotation orientation is obtained, the scan signals $S_X$ and $S_\theta$ will coincide so that the error signal from the coincidence circuit becomes zero to arrest the action of the servo drive.

In like manner, the lack of coincidence between output scan signals $S_X$ and the reference signal $S_{RX}$ is employed for actuation of servo drive 12 to position article in the "X" direction of the reference plane. For this purpose the reference signals $S_{RX}$ from the sensor 40, on lead 52, are connected through amplifier 65 to the peak detector circuit 66 for comparison with the output from peak detector 57 associated with scan signal $S_X$. The error signal generated by the coincidence circuit 61 is used to activate the servo drive 12 for the indicated positioning of article 1 in the "X" direction of the reference plane.

Similarly, the output scan signals $S_Y$ from sensor 5, on lead 53, are connected through amplifier 68 to the peak detector circuit 69 with the output connected to the coincidence circuit 64 which also receives the response of the peak detector circuit 70, which, in turn, is connected through amplifier 71 to the reference signal $S_{RY}$ in the lead 51 from sensor 48. The error signal generated by the coincidence circuit 64 in response to the signals $S_Y$ and $S_{RY}$ is applied to the servo drive 13 to position article 1 in the "Y" direction of the desired reference plane.

FIGURE 1C illustrates a modification of the circuit of FIGURE 1B by which article 1 may be sequentially orientated in the angular "$\theta$" adjustment, "X" adjustment and "Y" adjustment with respect to a desired reference plane. In addition, the circuit of FIGURE 1C enables the measurements of the cross-section extensions of article 1. Corresponding elements of the two figures are indicated by like numerals, and in view of the similarity in the operation of the common portions of the circuits, the description of FIGURE 1C for purposes of brevity, will be given with emphasis on the modifications made.

As shown, the output of peak detector circuit 66, associated with reference signal SRX, is controlled by means of a gate 72 activated by the output of an inverter circuit 73 having its input connected to the output of the "$\theta$" coincidence circuit 60. In this manner, the input of the reference signal $S_{RX}$ response from the associated peak detector circuit 66 is prevented, by gate 72, from entering the coincidence circuit 61 until coincidence is obtained between the scan signals $S_X$ and $S_\theta$ as indicated by a zero output from their associated coincidence circuit 60. This zero output is changed by inverter 73 into a positive signal which activates gate 72 permitting the reference signal $S_{RX}$ response of peak detector circuit 72 to pass through.

After correction of the deviation of article 1 in the X direction, the zero outputs of coincidence circuits 60 and 61 are converted into positive form by respective inverters 73 and 74 which are passed through the AND circuit 75 for actuation of gates 76 and 77 controlling the comparison of, respectively, the output scan signal $S_Y$ and the reference signal $S_{RY}$. In this manner the sequential positioning of article 1 in the desired $\theta$ and X orientation will activate gates 76 and 77 to permit the desired comparison of the signals $S_Y$ and $S_{RY}$ in their associated coincidence circuit 64, and accompanying correction of article 1 in the "Y" direction of the reference plane.

In addition, after sequential orientation of article 1 in the "$\theta$" and "X" directions, the zero output, upon conversion into positive form by inverter 74, may be ANDed with the amplified signal $S_X$ through the AND circuit 78 to activate gate 79 for passage of pulses from oscillator 80 to the counter 81 for the duration of the scan signal $S_X$. In this manner, the counter 81 will be enabled to provide a pulse count proportional to the length of the extension of article 1 in the "X" direction.

In similar manner, after the orientation of article 1 in the $\theta$, X and Y coordinates, the zero output of coincidence circuit 64 is converted by inverter 82 into positive form for ANDing with the amplifier scan signal $S_Y$ through AND circuit 83 for activating gate 84 to permit the passage of the pulses of oscillator 80 to counter 85. Thus counter 85 will provide a pulse count proportional to the length of the extension of article 1 in the Y direction.

Figure 2:
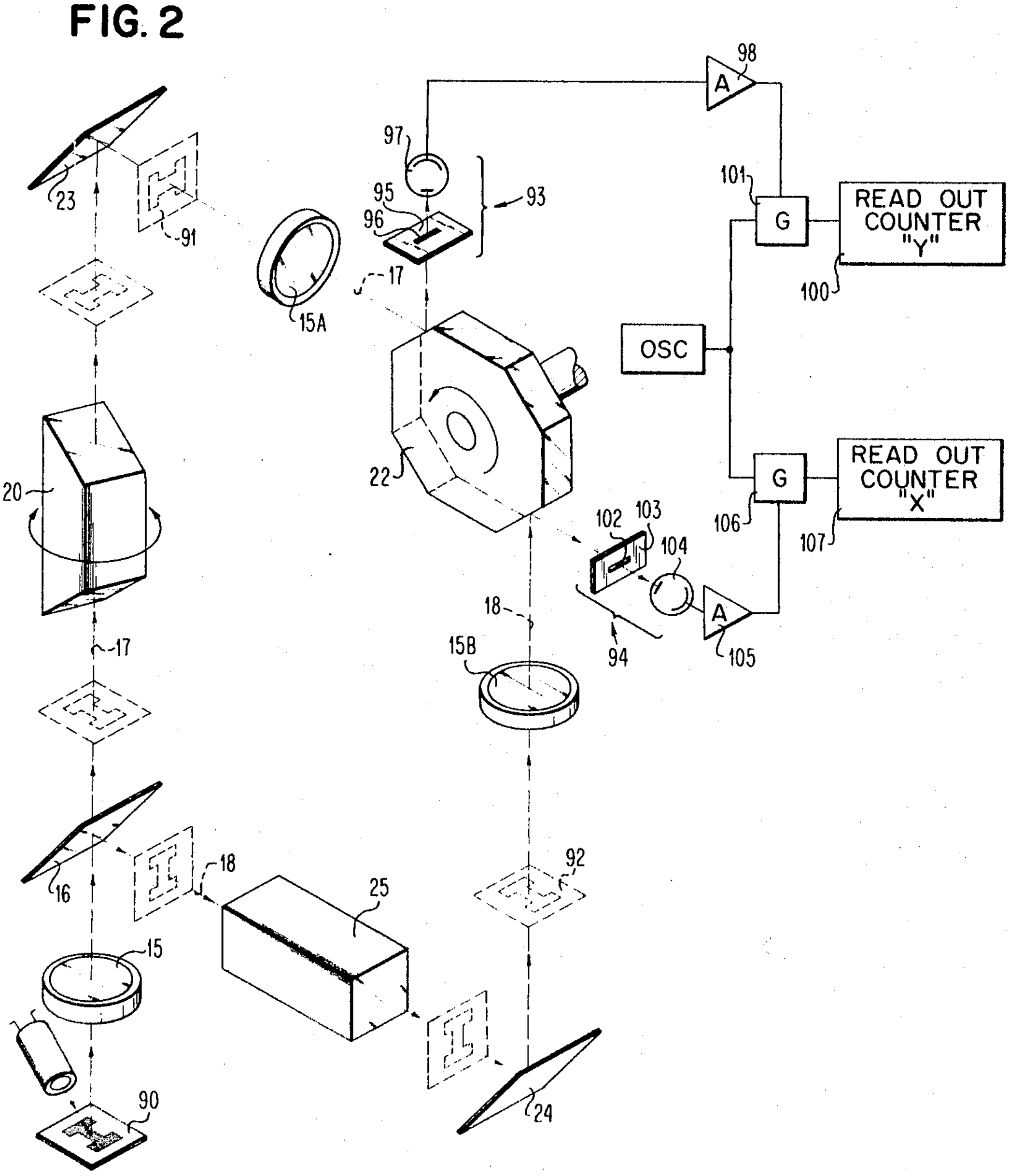
FIGURE 2 is a diagrammatic perspective illustrating another embodiment of this invention for measuring transverse extension of a cross-section of an article.

FIGURE 2 illustrates a system, in accordance with this invention, for measuring the lengths of the extensions, in the "X" and "Y" directions, of an article 90 which has been pre-orientated by the previous embodiment described above or by other suitable positioning or orienting devices. In this embodiment, the general method of generating and transmitting a rotated image and an unrotated image of article 90 along separate respective paths 17 and 18, as shown, is substantially the same as the embodiment of FIGURE 1A, and the corresponding elements are indicated by like legends. However, in contrast to the preceding embodiment, the optical paths 17 and 18 of the respective rotated and unrotated images 91 and 92, are directed to different peripheral surfaces of the polygonal scanning mirror 22. In this manner reflected images are scanned across the associated sensing units 93 and 94. Sensing unit 93 comprised a scan plate 95 provided with an aperture slit 96 across which the rotated image is scanned. Light passing through the aperture slit 96 to the photocell 97 is amplified in amplifier 98 for activating a gate 101 to permit the passage of the pulses of an oscillator 99 to the read-out counter 100 to provide an indication of the extension of article 90 in the Y direction. In similar manner, the scanning of the unrotated image 92 by scanner 22 across the aperture slit 102, of scan plate 103. This scanning passes light to the photocell 104 which generates a signal which is amplified in amplifier 105 for activating gate 106. The activation of gate 106 permits passage of the pulses from oscillator 99 to readout counter 107 to provide a corresponding indication of the length of article 90 in the X direction.

Figure 3:
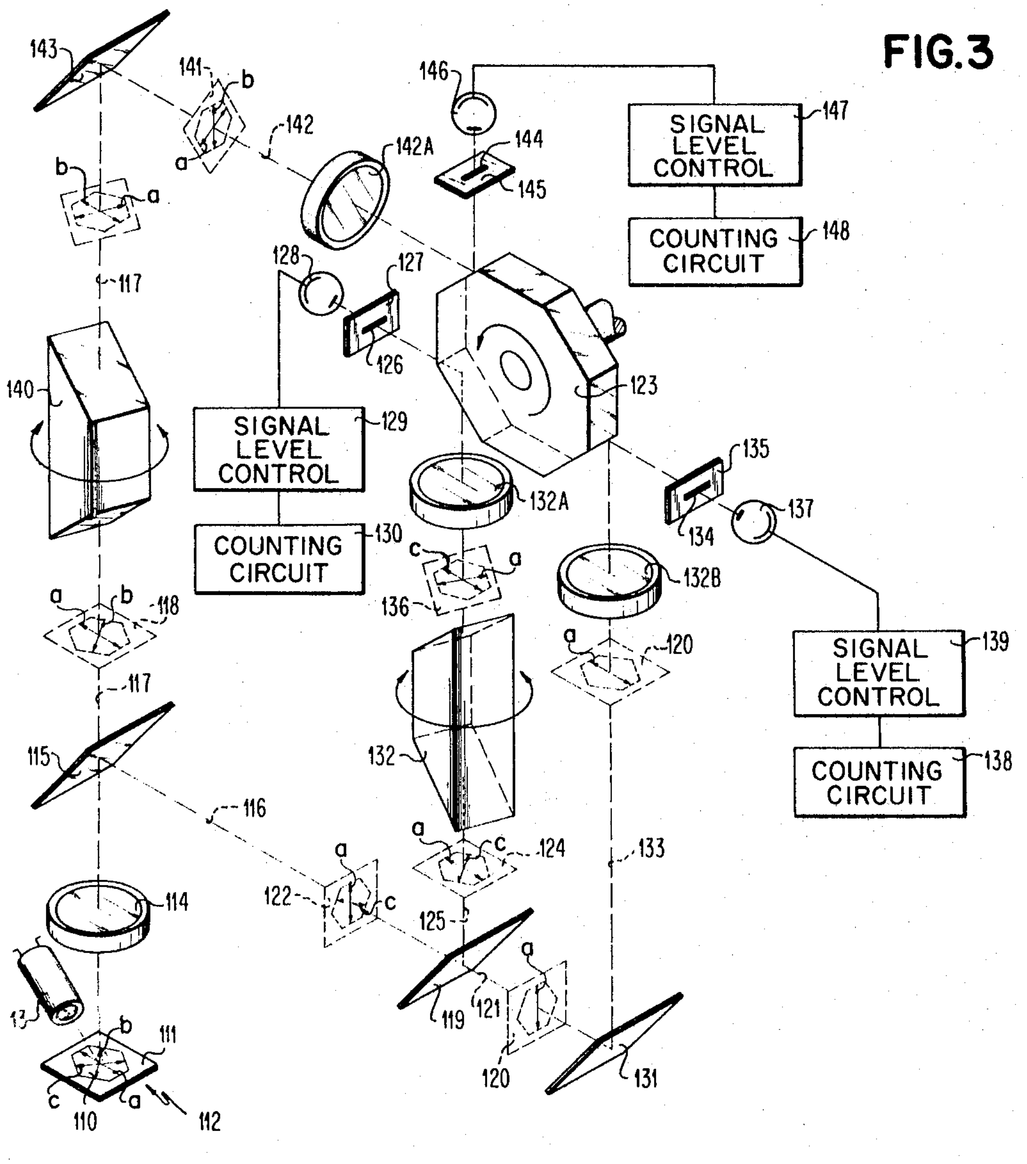
FIGURE 3 is a diagrammatic perspective illustrating an additional embodiment of this invention for measuring transverse dimensions of an article having a polygonal cross-section.

FIGURE 3 shows an embodiment illustrating the versatility of this invention for measuring the spacing or distance between each pair of opposites of a hexagonal imprint 110 on a surface 112 of a substrate 111 having different light modifying properties. For example, the polygonal imprint 110 may have given light properties which are more reflective than the remaining portions of the substrate 111. In the form shown, the substrate is shown in a prealigned position with the extension of spacing *a*, of its associated pair of opposite sides of imprint 110, extending parallel to the scanning path of scanner 123. In this embodiment the surface 111 of the substrate 112 is illuminated by light source 113 to project an image of the surface through a collimator, such as lens 114, to a beam splitter 115 which reflects the image 122 as a corresponding image along an optical path 116, and transmits a second corresponding image 118 along an optical path 117.

Figure 3A:
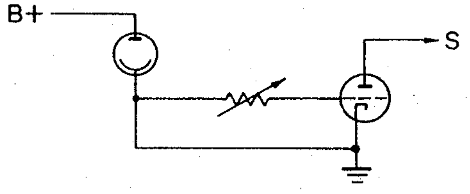

Interposed in the optical light path 116 is a second beam splitter 119 which intercepts the reflected image 122, and transmits it as a corresponding image 120 along a light path 121, and also reflects the image 122 as another image 124 along an optical path 125 which is traversing an image rotating Dove prism 132 and an eyepiece 132A to a reflective face of the polygonal scanner 123. Passage of the optical image through the Dove prism 132 rotates the image in a plane normal to optical path 125 an amount determined by the angular adjustment of the Dove prism 132 in rotation around its longitudinal axis. In general, as in this embodiment, the angular adjustment of Dove prism 132 will be in an amount sufficient to dispose the extension *c* of the spacing between its associate pair of opposite edges of the hexagonal imprint 110, parallel to the scanning path of scanner 123, as indicated by the rotated image 136. Rotation of scanner 123 results in the reflection of the incident image 136 in a scanning movement across an aperture slit 126 of scan plate 127 at a rate controlled by the angular velocity of scanner 123. This scanning across aperture slit 126 moves the image 136, concurrently, across the slit 126 and across the photocell 128 by passage thereto through the slit. The incident of the scanned image on photocell 128 results in conversion of the incident light into an output signal which is controlled by a conventional signal level control circuit 129, such as illustrated in FIGURE 3A. This provides an output to the counter circuit 130 corresponding to the light intensity emanating from the reflective properties of the imprint 110, while suppressing the effects of the light emanating from the remaining portions of the substrate surface 111. In this manner, the photocell 128 will be controlled to provide an output corresponding to the reflective properties of imprint 110 for a time interval proportional to the length of the spacing *c* of the associated pair of opposite edges of the hexagonal imprint. This time interval of the output of photocell 128 activates the counter circuit 130 for a corresponding time to provide an output proportional to the dimension being measured, which here corresponds to the length of the indicated spacing *c* between its associated pair of opposite edges of the hexagonal imprint 110.

The image 120 transmitted through beam splitter 119 is reflected by a mirror 131 along an optical path 133 through an eyepiece 132B to a second reflective face of the scanner 123 from which it is reflected as an scan across the aperture slit 134 of scan plate 135.

Scanning of the image 120 across the aperture slit 134 of scan plate 135 results in a corresponding movement of the image 120 across the photocell 137 which provides an output signal which is employed through the signal level control 139 to activate the counter circuit 138. As with the preceding similar elements, a signal level control 139 may be employed to control the response of photocell 137 into an output corresponding only to the light intensity generated by the reflective properties of the imprint 110. No compensating block is needed in optical path 133; the additional optical path length introduced by Dove prism 132 in path 125 is compensated for by path 121 between beam splitter 119 and reflector 131.

The extension of the third spacing *b* between its associated pair of opposite edges of the hexagonal imprint 110, is measured from the image 118 transmitted through beam splitter 115 along the optical path 117. As immediately preceding, an image rotating Dove prism 140 is interposed in the optical path 117 to rotate the image 118 in a plan normal to the optical path 117. The degree of the rotation of the image 118 is controlled by the angular adjustment of the Dove prism 140 by rotating it about its longitudinal axis an amount sufficient to dispose the extension of spacing *b* parallel to the scanning path of the scanner 123, as indicated by the rotated image 141 in optical path 117. The optical path of the rotated image is deflected by a mirror 143, interposed in the light path 117 through an eyepiece 142A to another reflective face of the polygonal scanner 123 from which the rotated image 141 is scanned across an aperture slit 144 of the scan plate 145. The successive portions of the rotated images 141 scanned through the aperture slit 144 to the photocell 146 results in an output, which by control of the signal level control 147, activates the counter circuit 148 which provides the desired measurement of the length of the extension of the spacing *b* between its associated pair of edges of the hexagonal imprint 110 on the substrate surface 111.

Although the invention has been described in reference to specific applications of positioning and measuring dimensions of an article, it will be understood that the invention may be readily adapted for numerous and varied inspection and control purposes in the fabrication of various devices. By way of example, the invention can be used in control systems for inspection of properly sized and shaped optical masks as used in the fabrication of microelectronic components.

While the invention has been particularly shown and described with reference to the preferred embodiments thereof, it will be understood by those skilled in the art that the foregoing and other various changes in form and details may be made therein without departing from the spirit and scope of the invention.

What is claimed is:

1. An apparatus for measuring transverse edge-to-edge dimensions of an object along parallel scanning paths comprising:

(a) a projection means including a beam splitter for transmitting a first and second image of said object in, respectively, separate first and second paths;

(b) optical means disposed in said first path for rotating said first image in a plane normal to said first path and to dispose one of said dimensions substantially parallel to the other of said dimensions; and (c) scanning means for unidirectionally scanning said rotated first image and said second image along paths substantially parallel with the said other dimension, said scanning means including (d) radiation responsive means for providing output signals proportional to respective each of said dimensions.

2. The apparatus of claim 1 wherein said dimensions are normal to each other, and said optical means is adapted to rotate said first image 90°.

3. A scanning apparatus for two dimensional scanning of an object along unidirectional paths comprising:

(a) a first projection means for transmitting a first image of said object;

(b) a second projection means for transmitting a second image of said object, with said second projection means including (c) means for rotating said second image 90° in a plane normal to the optical path thereof;

(d) a first radiation sensitive means for said first image to derive output signals providing information relative thereto;

(e) a second radiation sensitive means for said rotated second image to derive output signals representing information relative thereto; and (f) scanning means for unidirectionally scanning said first image and said rotated second image across, respectively, said first and said second radiation sensitive means.

4. A scanning apparatus for two dimensional scanning of an object along unidirectional paths comprising:

(a) a projection means, including a beam splitter for transmitting first and second images of said object in, respectively, a first optical path and a second optical path, (b) a first radiation sensitive means for said first image to derive output signal providing information relative thereto;

(c) a second radiation sensitive means for said second image to derive output signals providing information relative thereto;

(d) a unidirectional scanning means for scanning said first and said second images across, respectively, said first and said second radiation sensitive means;

(e) means disposed in said first path for directing said first image to said scanning means;

(f) means disposed in said second path for angularly rotating said second image 90° in a plane normal to said second path; and (g) means disposed in the path of said rotated second image for directing said rotated second image to said scanning means.

5. The apparatus of claim 4 wherein said scanning means comprises:

(a) a rotatable reflecting member having a polygonal peripheral configuration for recurrently reflecting said first image and said second rotated image to their respectively, said first and said second radiation sensitive means; and (b) means coupled to said reflecting member for imparting rotational motion thereto so as to recurrently scan said first image and said second rotated image across, respectively, the said first and said second radiation sensitive means.

6. A two-dimensional scanner comprising:

(a) a projection means including a beam splitter for transmitting a first and second image of an object in, respectively, separate first and second optical paths;

(b) optical means disposed in said first path for rotating said first image 90° in a plane normal to said first path;

(c) scanning means for unidirectionally scanning said rotated first image and said second image, with said scanning means including (d) radiation responsive sensitive means for providing an output signal indicating the orientation of said object relative to a reference plane.

7. The scanner of claim 6 including positioning means responsive to said sensing means for moving said object into a preselected position relative to said reference plane.

8. A scanner for two dimensional scanning of an object for orientation thereof relative to a reference plane, comprising:

(a) a first projection means for transmitting a first image of said object;

(b) a second projection means for transmitting a second image of said object with said second projection means including (c) means for rotating said second image 90° in a plane normal to the optical path thereof;

(d) a first light sensitive means for said first image to derive an output indicating the orientation of said object relative to a first direction of said reference plane;

(e) a second light sensitive means for said rotated second image to derive an output indicating the orientation of said object relative to a second direction of said reference plane normal to said first direction; and (f) scanning means for unidirectionally scanning said first image and said rotated second image across, respectively, said first and said second light sensitive means.

9. The scanner of claim 8 including positioning means responsive to the output signals of said first and said second light sensitive means for moving said object to a preselected position relative to said reference plane.

10. A two-dimensional scanner comprising:

(a) a projection means, including a beam splitter for transmitting first and second images of an object in, respectively, a first optical path and a second optical path;

(b) a first light sensitive means for said first image to derive an output signal indicating the orientation of said object relative to a first direction of a reference plane;

(c) a second light sensitive means for said second image to derive an output signal indicating the orientation of said object relative to a second direction of said reference plane normal to said first direction;

(d) a unidirectional scanning means for scanning said first and said second images across, respectively, said first and said second light sensitive means;

(e) means disposed in said first path for directing said first image to said scanning means;

(f) means disposed in said second path for rotating said second image 90° in a plane normal to said second path; and (g) means disposed in the optical path of said rotated image for directing thereof to said scanning means.

11. The scanner of claim 10 including positioning means responsive to the output signals of said first and said second light sensitive means for moving said object to a preselected position relative to said reference plane.

12. The scanner of claim 10 wherein said scanner comprises:

(a) a rotatable reflecting member having a polygonal peripheral configuration for recurrently reflecting said rotated second image to their respective said first and said second light sensitive means; and (b) means coupled to said reflecting member for imparting rotational motion thereto so as to recurrently scan said first image and said rotated second image across, respectively, said first and said second light sensitive means.

13. The scanner of claim 12 including positioning means responsive to the output signals of said first and said second light sensitive means for moving said object to a preselected position relative to said reference plane.

14. The scanner of claim 13 wherein said rotating means comprises a prism from the group consisting of a Dove prism and Pechan prism.

15. A two dimensional scanner comprising:

(a) a beam splitter for transmitting first and second images of an object in respectively, a first optical path and a second optical path, (b) optical means disposed in said first path for rotating the first image therein 90° in a plane normal to said first path;

(c) means disposed in said first path for directing said rotated first image to a reflecting means for reflection to a first sensing means for indicating the orientation of said rotated first image relative to one direction of a reference plane;

(d) means disposed in said second path for directing said second image to said reflecting means for reflection to a second sensing means for indicating the orientation of said second image relative to a direction of said reference plane normal to said one direction thereof; and (e) means coupled to said reflecting means for causing said reflecting means to simultaneously scan said rotated first image across said first sensing means and scan said second image across said second sensing means.

16. The scanner of claim 15 including positioning means responsive to said first and said second sensing means for moving said object into a preselected position with reference to said reference plane.

References Cited

UNITED STATES PATENTS

| | | | |
|---|---|---|---|
| 2,696,565 | 12/1954 | Shockley | 250—219 |
| 2,859,653 | 11/1958 | Blackstone | 350—285 |
| 3,029,348 | 4/1962 | Heinz | 250—222 |
| 3,207,904 | 9/1965 | Heinz. | |
| 3,216,311 | 11/1965 | Bibbero et al. | |
| 3,345,120 | 10/1967 | Palmer | 350—285 |
| 3,350,156 | 10/1967 | Adams | 350—285 |

WALTER STOLWEIN, Primary Examiner

U.S. Cl. X.R.

250—236; 318—19, 480; 350—6; 356—167